7619X
A. Brook.
Silk Spinning Mach.
Patented Jun. 29, 1833.
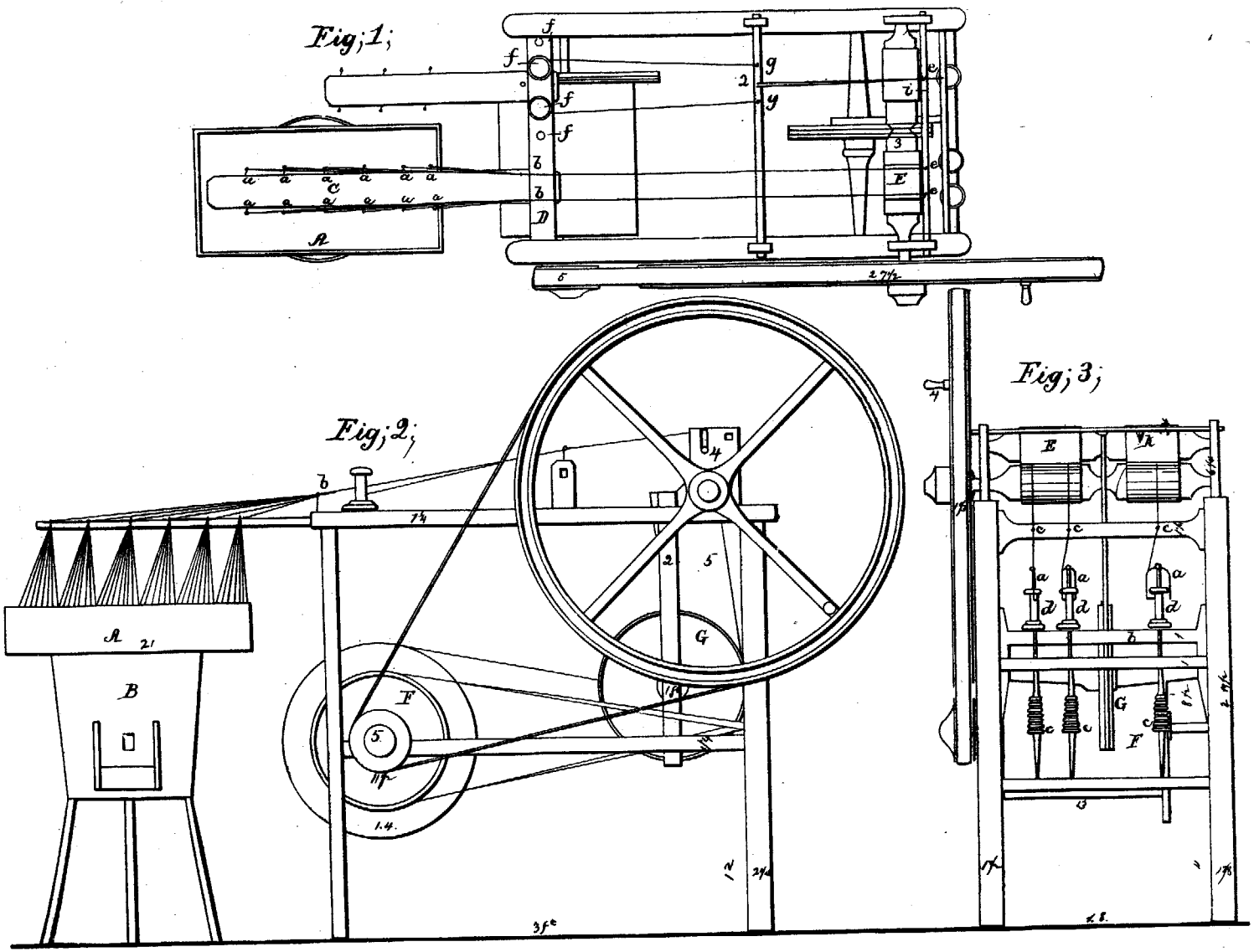
N. PETERS, PHOTO-LITHOGRAPHER, WASHINGTON, D. C.

June 29. 1833 [illegible]

7619X Adam Brooks

The schedule referred to in these Letters Patent and mak-
ing part of the same containing a description in the words
of the said Adam Brooks himself of his improvement
in the machine for spinning silk.

To all to whom these presents shall come Be it known
that I Adam Brooks
of Scituate in the County of Plymouth and State of Mass-
achusetts have invented a new and useful improvement
in the art of spinning silk and the following is a full
and exact description ~~made up~~ of the construction and op-
eration of the said machine as invented or improved
by me Figure 1 represents the top of the machine Figure
2. the side, and Figure 3 the front A a tin pan about 21
inches long, 10 inches wide and four inches deep filled
with boiling water into which the cocoons are put after being
prepared for spinning. B. a common house furnace filled
with coals to keep the water hot C. is a strip of board
about 2½ inches wide and 2½ feet long passing through
a mortise in the bar D. in the sides of which are placed
curled wires through which the fibres are collected and
carried through the leading wires b.b. to hook c, (and
back from thence over the top roller E. and then between
the rollers through the curled wires the fliers a.a. to the
spools d.d. (which are similar to those common in cotton
mills) whose spindles are turned by the whirls e.e, with
bands from thence to the drum F. which has a large
whirl on one end of its axle connected by bands or belts,
to the large wheel which may be turned by hand, or if requir-
ed to do more business the number of spindles may be
increased and horse, steam or water power applied. This
[illegible] spins the silk into a perfect thread suitable for
the warp or filling for cloth, or for [illegible] [illegible] [illegible]
for [illegible] which is done by [illegible] the spools [illegible] [illegible]

they have received ~~upon~~ a sufficient quantity, and placing
them on the pins f.f. from which the threads of two or more are
carried through the leading wires g.g. and round the wire
h. and from thence over the upper roller and under the bar
i. around the wire k. fig 3. thence back over the upper
and between the rollers same as before to the flier a. the
spindle and a whirl of which are turned by a band around
the flange of the drum D. a band or belt passing over the
top roller and round the small wheel G. binds down the
roller so as to draw the silk gradually forwards from the co-
coons and spools through the wires to the fliers and also pro-
duces the vibrating motion of the slide b. for raising and
lowering the spools to receive the thread equally. Reference
to the draft for particular dimensions. What I claim as
my invention (was put in operation previous to the twenty
seventh of 2nd month (A.D.) 1833 and relates to arrang-
ing the collecting and leading wires nearly in a range
so as to draw the thread even and not break the fibres
as they would by irregular turns and collecting fibres
enough from the cocoons at once to make a thread of
any size that may be wanting and drawing them partly
round the upper roller to make it pass through the rol-
lers even to the spools (and spinning it immediately wet
in its natural gum in the best manner, into a finish-
ed thread. Also that of having a band or belt to pass over
the top roller round the small wheel answering the two fold
purpose of binding down the top roller so as to draw the thread
and carry the wheel producing the vibrating motion for the
spools. also the method of doubling the ~~[illegible]~~ thread for
drawing silk, by drawing the single thread separate a-
round the wires before they come together to make them
double even and then passing over the top roller round a
hook under the cross bar. then ~~back round between the~~
rollers 7619x June 29, 1833 rollers to make it draw even before it is twisted. Also
drawing the fibres from the cocoons by a steady motion,
breaking the fibres less than by reeling in the common way,
without loss from splitting or tangling, much finer, smoother,
stronger (and more even than any other method and with
great despatch. The other parts of the machine having been
in use before I only claim their application.

Witnesses                                        Scituate April 25. 1833.

Samuel A. Turner                                        Adam Brooks

[illegible] Brooks

Drawing in Portfolio                                        [-814